May 12, 1970 B. C. LAMI 3,511,926

CLOSED-CIRCUIT TV SWITCHING SYSTEM

Filed March 7, 1967 4 Sheets-Sheet 1

INVENTOR.
BENJAMIN C. LAMI
BY
Ralph R Roberts
AGENT

May 12, 1970 B. C. LAMI 3,511,926

CLOSED-CIRCUIT TV SWITCHING SYSTEM

Filed March 7, 1967 4 Sheets-Sheet 2

INVENTOR.
BENJAMIN C. LAMI

BY

Ralph R Roberts
AGENT

INVENTOR.
BENJAMIN C. LAMI
BY
Ralph R Roberts
AGENT

May 12, 1970 B. C. LAMI 3,511,926

CLOSED-CIRCUIT TV SWITCHING SYSTEM

Filed March 7, 1967 4 Sheets-Sheet 4

INVENTOR.
BENJAMIN C. LAMI
BY Ralph R. Roberts
AGENT

United States Patent Office 3,511,926
Patented May 12, 1970

3,511,926
CLOSED-CIRCUIT TV SWITCHING SYSTEM
Benjamin C. Lami, 186 Beverly Hill Road, Clifton, N.J. 07012
Filed Mar. 7, 1967, Ser. No. 621,167
Int. Cl. H04n *7/02*
U.S. Cl. 178—6 9 Claims

ABSTRACT OF THE DISCLOSURE

A closed-circuit TV system having a switching circuit in place of an amplifier supplied feeder circuit, said circuit feeding a plurality of monitors placed selectively in connection with one of a plurality of cameras with only a momentary disruption, while switching, of the continuity of the signal flow to other monitors. Each feed line provides a signal flow from a camera to an impedance and ground and is disposed so that switches may cut into the line to feed the signal to a monitor and finally to the impedance and ground.

BACKGROUND OF THE INVENTION

Field of the invention

The circuit of this invention pertains to both circuits and switches, as for example to the general class of Telegraphy and the subclass of Systems with Facsimile with optical and with secret systems. The general class of Electricity, Circuit Makers and Breakers is also relative to the invention and particularly to the subclass directed to plural switches. The general class of Electrical Transmission or Interconnecting Systems is noted as possibly r - ative and in particular the subclass of Switching Systems.

DESCRIPTION OF THE PRIOR ART

The use of a closed-circuit TV system for monitoring as an observer system in stores, banks, and the like is well known. Conventionally, in these systems, cameras are directed toward viewing in one particular area and are operatively connected to monitors in a remote area where an operator may observe the flow of traffic, the action of customers, specific operations, etc. Many systems are more elaborate and include a plurality of cameras disposed in many areas and also include a plurality of monitors desirably adapted to cut into a camera feeding circuit system so that each monitor operator may selectively observe the various activities being shown on the various cameras. Heretofore, it has been customary for systems having a plurality of cameras to have their output signal fed to an amplifying and distributing circuit. Each amplifying circuit then provides a carrying line for the signal from the camera which may be fed to any or all monitors. As each amplifying channel or circuit requires a rather elaborate circuitry a plurality of amplifying circuits for several cameras is comparably expensive and it is therefore the intent of this invention to provide a looping switching means whereby a plurality of cameras have their signals fed to lead circuits adapted to be sampled by a plurality of monitors, each monitor connected so as to be selectively switched to sample the signal of any of the cameras in the system.

It is to be noted that in conventional systems a single camera feeds the video output signal through a coaxial line to a first monitor and from this monitor to and through subsequent monitors connected in series to a final monitor which is connected by a coaxial line to a fixed impedance and thence to a ground.

Various U.S. patents are representative of the circuits and switches familiar to the art. A closed circuit television network is shown in the U.S. Pat. No. 3,255,306 to Campbell of June 7, 1966 which shows a system using an amplifier circuit. A television distribution system is shown in the U.S. Pat. No. 3,230,302 to Bruck of Jan. 18, 1966 in which an amplifier is also used to feed the signal to the circuit. Switches are shown in U.S. Pat. No. 2,794,081 to Luhn of May 27, 1957 and U.S. Pat. No. 2,816,183 to Mangel of Dec. 10, 1957. Switching systems are shown in the U.S. Pat. No. 3,117,303 to Byrne of Jan. 7, 1964 and in U.S. Pat. No. 2,797,341 to Thomas of June 25, 1957. As far as is known prior closed circuit TV systems having a plurality of cameras connected to a plurality of monitors have used amplified circuits to supply a signal to the various monitors.

In the circuit of this invention to be shown and described and in which a plurality of cameras are arranged to feed a plurality of monitors without the necessity or benefit of an amplifier circuit for the signal from each camera. In the circuits of this invention each signal terminates in a fixed impedance thence to the ground whether one or more monitors is cut into the circuit or not. Whereby prior known closed-circuit TV systems have required the design and use of distributing amplifiers with a particular number of circuit capabilities adapted to accommodate a selected number of cameras, the switching arrangement of the circuit of this invention permits an inexpensive switching circuit in which additional capacities may be initially provided at little expense even if not immediately used.

SUMMARY OF THE INVENTION

From one of a plurality of TV cameras a video signal feeding line extends to a fixed impedance and ground and between the camera and this fixed impedance a plurality of monitors are connected so as to be switched into or out of the signal feeding line with only a momentary disturbance of the continuity of signal flow, said circuitry requiring no amplification of the carrying signal. Also shown in this invention and to be hereinafter more fully described is a switching system whereby a plurality of cameras, as for example six, are arranged so that from each camera a signal feeding line extends to an impedance and ground. Each of a plurality of monitors are connected to a switch connected to each line and adapted to be switched into any of the lines from the cameras so that the monitor may selectively receive the signal from any of the cameras. Also shown in this invention is a wafer type switch in the form of a rotary switch in which the switch may be selectively moved to one of several positions. Each switch position enables the monitor attached to this switch to receive the signal from a designated one of the cameras in the system as selected by the switch.

It is therefore an object of this invention to provide a switching circuit or system whereby the use of a distributing amplifier is not required and whereby the monitors may be switched into the various circuit lines feeding from the various cameras, each monitor being connected so that it may be selectively connected to any of the cameras in the system.

It is a further object of this invention to provide a simple switching system whereby at each monitoring station the signal from every camera may be selectively switched into the monitor, as desired, with the continuity of the system only momentarily disturbed so that subsequent monitors may also be switched to select any of the cameras in the system.

It is a further object to provide a means for switching in which each monitor is adapted for connection to a plurality of circuit lines each carrying a video signal, the switch having selective means to sample each line while providing conducting means for those lines not being sampled by the particular monitor.

There has been outlined rather broadly the most important features of the closed-circuit TV switching system of this invention in order that the present contribution to the art may be more fully appreciated. Those persons skilled in the art will appreciate that the conception on which the present disclosure is based may be utilized as the basis for designing similar systems and structure carrying out the purposes of this invention.

DESCRIPTION OF THE PREFERRED EMBODIMENTS

Figure 1:
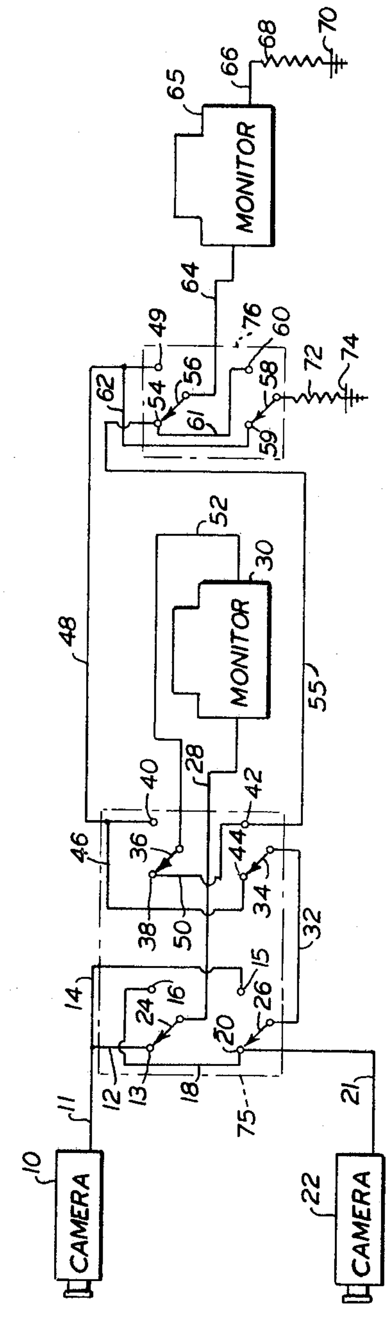
FIG. 1 represents a circuit in which two TV cameras are arranged to each feed a video signal into a circuit in which two monitors are likewise connected so as to selectively sample the signal from either camera as desired by each monitor operator.

Referring now to the drawings in detail in which like numbers refer to like members throughout and in particular to FIG. 1 in which a first camera designated as camera 10 is connected to a coaxial line 11 feeding a video signal to a junction in which one lead 12 goes to a contact 13 of one side of a first pole of a four-pole double-throw switch and the other lead 14 is connected to an opposite throw contact point 15 of the second pole of this switch.

A contact 16, opposite contact 13 of the first pole, is connected by a lead 18 to a contact 20 on the second throw opposite contact 15. Contact 20 is connected by lead 21 to the second camera identified as 22. The knife conductor of the second throw is designated as 24; the knife conductor of the second throw is designated as 26. From knife 24 a lead 28 extends to the video input jack of the first monitor identified as 30. From knife conductor 26 a lead 32 extends to a like attaching point on knife 34 which is the fourth pole of this switch. The third knife conductor of this four-pole switch is identified as 36, and as shown, is in engagement with contact 38 while the opposite throw contact is identified as 40 and a like throw contact of the fourth pole is identified as 42. An opposite throw contact portion 44 is in engagement with knife 34 and a lead 46 extends from contact 44 to a by-pass lead 48 connecting contact 40 with a contact 49 of yet another monitor control switch which is a double-pole, double-throw switch.

From contact 38 to contact 42 a lead 50 is connected and from the third knife 36 a lead 52 connects to the video output jack of the first monitor 30. From contact 42 of the fourth throw of the first monitor control switch to a first pole contact 54 of the second monitor controlling switch there extends a lead 55. This second switch, as exemplified, is a double-pole, double-throw switch. The first pole knife of the double pole switch is identified as 56 and the second pole knife as 58. Knife 58 is shown in engagement with contact 59 and is movable to the opposite throw contact 60. A lead 62 extends from a junction with lead 48 or from contact 49 to contact 59 and a lead 64 connects the first pole knife 56 to the input jack of the second monitor identified as 65. The output jack of this monitor is connected to a lead 66 terminating in an impedance 68 and thence to a ground 70. The second pole knife 58 is connected to an impedance 72 and thence to a ground 74. Both the impedance 68 and 72 in the present embodiment are contemplated to be seventy-five ohms as this resistance is the computed impedance necessary to balance this particular standard closed circuit TV system.

SWITCHING SEQUENCE OF FIG. 1

The switches controlling the two monitors shown in FIG. 1 are shown as set for sampling the signal from the first camera 10. From this camera a video signal is fed through lines 11 and 12 to contact 13 and from there to first pole knife 24 then through lead 28 to the input jack of the first monitor 30. From the output jack of this monitor the video signal is fed through lead 52 through third pole knife 36 to contact 38 thence through lead 50 to contact 42. From this contact the signal is fed through lead 55 to contact 54 in the second switch thence through first pole knife 56 through lead 64 and to the input jack of the second monitor 65. From the output jack 66 of this monitor the signal is fed to the impedance 68 and thence to the ground 70. The circuit as connected to first monitor 30 and second monitor 65 are both viewing camera 10.

When the operator of the first monitor 30 is desirous of viewing the signal from the second camera 22 the four-pole double-throw switch as enclosed in phantom outline 75 is moved so that knives 24, 26, 36 and 34 are in engagement with the opposite contacts. As thus shifted, the signal from camera 22 passes through lead 21 to contact 20 thence through lead 18 to contact 16. The signal continues through first pole knife 24, thence through lead 28 to the input jack of the first monitor whereby the second camera is viewed by the first monitor while the second monitor 65 still views the signal from the first camera 10.

When the operator of the second monitor 65 desires to view the second camera 22 the double-pole double-throw switch indicated in the phantom outline box 76 is moved or thrown so that first pole knife 56 and second pole knife 58 is engaged respectively with contact 49 and 60. With the four-pole, double-throw switch 75 for the first monitor set to view camera number 22, the signal from the second camera 22 is carried through lead 21, lead 18 to contact 16 thence through first pole knife 24 and then through lead 28 to the input jack of the first monitor 30. From the output jack of this monitor the signal is carried through lead 52, through third pole knife 36 and to contact 40 thence through lead 48 and to the contact 49. The signal from contact 49 is carried through the first pole knife 56 and then through lead 64 to the input jack of the second monitor 65. From the output jack of this monitor the signal terminates through the output line 66 to the impedance 68 and finally ground 70.

If the four-pole double-throw switch 75 controlling the first monitor 30 is set as in FIG. 1 and it is desired for the second monitor 65 to view the video signal from the second camera 22 then the double-pole double-throw switch 76 is shifted or thrown so that the knives 56 and 58 are in engagement with contacts 49 and 60. As thus shifted, the signal from camera 22 is fed from the second camera through lead 21 to contact 20 through second pole knife 26 thence through lead 32 to fourth pole knife 34. From knife 34 the signal is fed to contact 44 through lead 46 and connected lead 48 to contact 49 thence through first pole knife 56 and lead 64 to the input jack of the second monitor 65. From the output jack of this monitor the signal terminates through the lead 66 to impedance 68 and ground 70.

If the four-pole double-throw switch 75 controlling the first monitor 30 is switched to the opposite position as seen in FIG. 1 so that the first monitor 30 is sampling the signal from the second camera 22 and it is desired for the second monitor 65 to sample the signal from the first camera 10 then the second switch 76 is set as in FIG. 1. With the first switch 75 in the opposite position the signal from camera 10 is fed through lead 11, continues through lead 14 to contact 15 and through knife second pole 26. From this knife the signal is fed through lead 32 to and through fourth pole knife 34 to contact 42, through lead 55 to contact 54, through first pole knife 56 thence through lead 64 into the input jack of the second monitor identified 65. From the output jack of this monitor the signal terminates through the lead 66 through impedance 68 and to ground 70.

As the second monitor 65 views the first camera 10 the first monitor 30 is viewing the second camera 22 with the video signal therefrom proceeding through lead 21 and lead 18 to contact 16. From this contact the signal is fed through first pole knife 24 and lead 28 to the input jack of first monitor 30. The signal proceeds from the output jack of the monitor 30 and is fed through lead 52, third pole knife 36 to contact 40 and through lead 48 to lead 62 and contact 59. The signal is terminated through second pole knife 58 to and through impedance 72 thence to ground 74.

Assuming both switches 75 and 76 are set to feed the signal from the first camera 10 to both monitors as seen in FIG. 1; the signal from the second camera 22 is conducted through lead 21, to contact 20 and second pole knife 26. From knife 26 this signal flows through lead 32, thence through the fourth pole knife 34 to contact 44. From contact 44 the signal passes through lead 46 to and through lead 48, lead 62 and contact 59 thence through second pole knife 58 to impedance 72 and to ground 74.

Assuming both switches 75 and 76 are set to feed the signal from the second camera 22 to both monitors, the knives of both switches are in contact with those contacts opposite to the arrangement seen in FIG. 1. The unviewed signal from the first camera 10 is conducted through lead 11, then through lead 14 to contact 15. From contact 15 the signal flows through second pole knife 26, through lead 32 to the fourth pole knife 34 and to contact 42. From contact 42 the signal is fed through lead 55 to contact 54 then through lead 61 to contact 60 thence through second pole knife 58 to impedance 72 and to ground 74.

Figure 2:
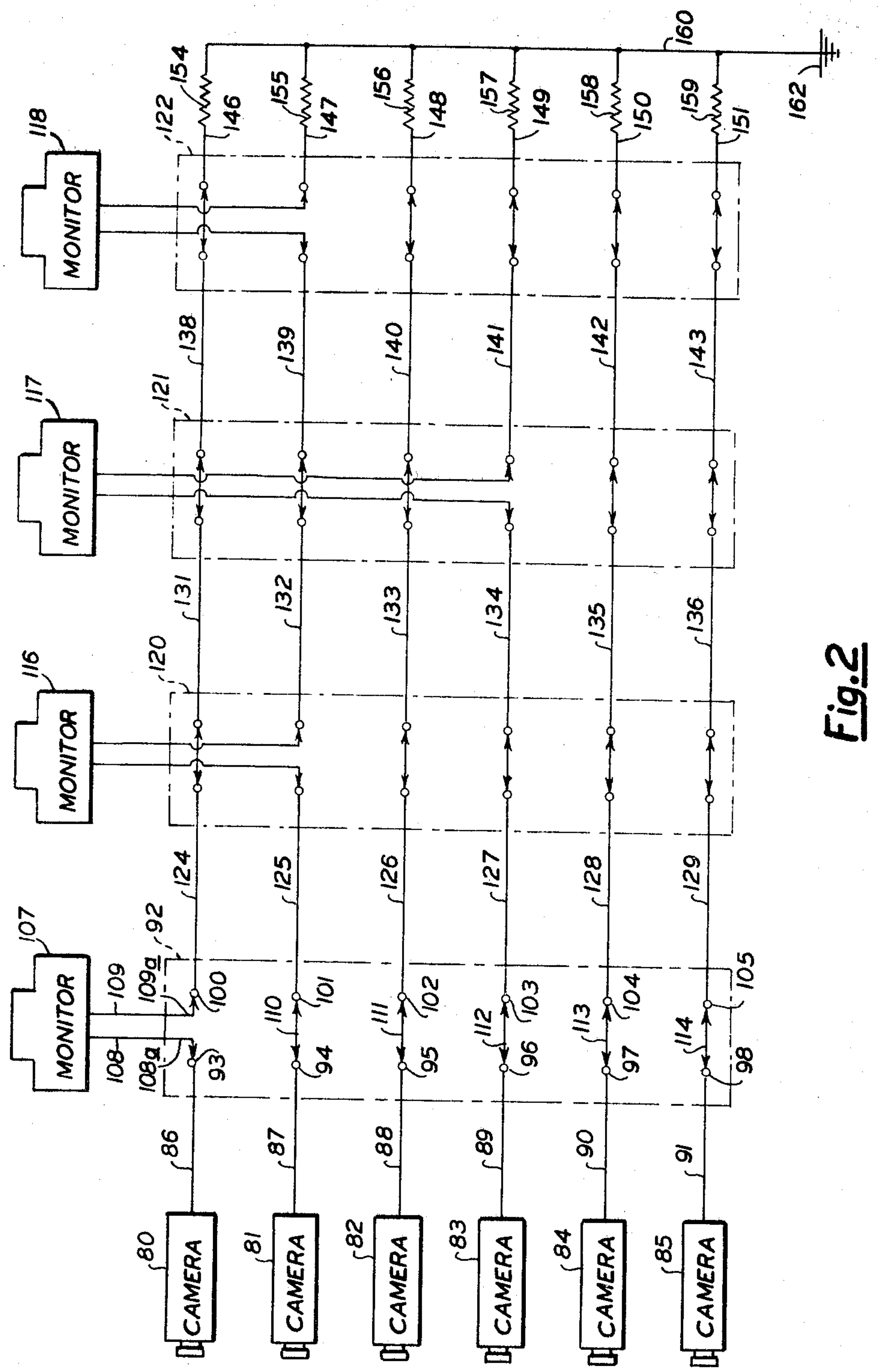
FIG. 2 represents a circuit system in which six cameras are arranged to each feed a video signal into a lead line system into which four monitors are connected so as to be selectively switched to the signal from any of the six cameras, and so that each monitor may sample one-at-a-time the signal from any of the six cameras.

Referring next to FIG. 2 in which is shown a circuit with a multiplicity of cameras, as for example six, serving a plurality of monitors, as in this case four. The number of monitors and of cameras is determined by the conductive paths through a switch to provide the particular circuitry required. In this exemplification, it is to be noted, that a first camera is identified as 80, a second camera as 81, a third camera as 82, a fourth camera as 83, a fifth camera as 84 and a sixth camera as 85. From these cameras coaxial leads respectively identified as 86, 87, 88, 89, 90 and 91 are fed to terminals in a switch 92, whose input terminals or contacts are identified as 93, 94, 95, 96, 97 and 98. The switch 92 is indicated in the circuit in a dashed outline. Opposite the input terminals are output terminals or contacts 100, 101, 102, 103, 104 and 105.

A first monitor identified as 107 has co-axial leads 108 and 109 attached to a movable connector adapted to engage sequentially the contactable terminals 93 through 98 and the contactable terminals 100 through 105. Switch 92, as reduced to practice, is a rotary switch in which, for a six camera system, there are five movable connecting or conductor bars identified as 110, 111, 112, 113 and 114. Spaced equally with and adapted to be moved at the same time as said connecting bars are connector segments 108*a* and 109*a* extending from leads 108 and 109 and adapted to engage the contacts 93 and 100 as seen in FIG. 2. As the connector segments 108*a* and 109*a* from leads 108 and 109 are rotated into engagement with other pairs of contact terminals the connector segments 110 through 114 are moved into contact with the remaining five pairs.

A second monitor identified as 116, a third monitor identified as 117 and a fourth monitor identified as 118 are similar to the first monitor 107, and each of these monitors is similarly connected to switches of construction like the switch identified as 92, these switches being identified as 120, 121 and 122. However, this sequence of switches and monitors is not limited to the four shown but may be multiplied to the extent of the number of monitors desired in the system. It is to be noted that from the first switch 92 to the second switch 120 there are provided coaxial leads 124, 125, 126, 127, 128 and 129 which are connected to similar terminal points or contacts within the switch 120. Similar coaxial leads identified as 131, 132, 133, 134, 135 and 136 extend from switch 120 to switch 121 as do coaxial leads 138, 139, 140, 141, 142 and 143 from switch 121 to switch 122. The monitor 118 and switch 122 represent the last monitor and switch of the series whereupon terminating coaxial leads identified as 146, 147, 148, 149, 150 and 151 extend from switch 122 to impedances sequentially identified as 154, 155, 156, 157, 158 and 159 from which these impedances are commonly connected to a terminating lead 160 thence to a ground 162.

As seen in FIG. 2, the user of the first monitor identified 107 is assumed desirous of viewing the first camera identified 80 and so the switch 92 is in the position as shown. As connected, the signal of camera 80 passes through lead 86, to contact 93, connector segment 108*a*, and through lead 108 to the monitor 107. The signal, while being sampled by the monitor 107 is then conducted from the monitor and passes through lead 109 connector segment 109*a* to contact 100 and thence through lead 124 to the internal connector in switch 120. The signal continues through a conductor bar to and through lead 131 thence through the internal conductor in switch 121 and to and through lead 138. From this lead the signal continues through the internal conductor in switch 122 and finally to lead 146 and to and through impedance 154 and thence through common conductor 160 to the ground 162.

Assuming a monitor operator is desirous of viewing the second camera 81, the switch is shifted to the position as shown by the switch 120 serving the second monitor identified 116 in FIG. 2. The switch contact system is moved so that the monitor feeding contacts are engaging the contacts from leads 125 and 132. The signal from the second camera 81 as thus arranged is fed through lead 87, contact 94 and through connector 110 to contact 101. From this contact the signal is fed through lead 125 to the monitor feeding contact thence to the monitor 116 which samples the signal while the signal is being fed back again to the internal contact in switch 120. The signal is then conducted through lead 132, through the conductor in switch 121 and through the lead 134 to switch 122. For the purpose of description, the switch 122 serving monitor 118 is also shown positioned to read the second camera 81 whereupon the signal through the lead 139 is fed to the monitor feeding contact thence to the monitor 118 where it is sampled thence back to the internal contact within the switch 122 to and through lead 147, impedance 155, to common conductor 160 and finally to the ground 162.

It is also to be noted that the third monitor, identified as 117 and served by switch 121, has the switch positioned to receive the signal from the fourth camera identified as 83. The output signal from this camera is fed through lead 89 to contact 96 in switch 92 and through internal conductor 112 to contact 103 thence through lead 127 to switch 120. The signal proceeds through the internal conductor in this switch and through lead 134 to switch 121. The monitor feeding movable connector segment in this switch receives the signal from the contact and feeds it to the third monitor identified 117 and thence back through the other movable connector segment to the internal contact and from switch 121 through lead 141 to the switch 122. The signal is carried through an internal conductor of switch 122 and through the lead 149, through impedance 157 to the common conductor 160 and to the ground 162.

In the circuit of FIG. 2, from every camera the video signal output terminates in a fixed impedance and ground. Each impedance, as reduced to practice in this circuit, is of seventy-five ohms. When the various switches in the circuit are shifted so that no monitor is viewing the camera signal, the signal is fed to the impedance in the manner of cameras five and six identified as 84 and 85. For example, from camera five the signal is fed through lead 90 to switch 92, through the internal conductor 113, through the second switch identified 120, third switch identified 121, and the fourth switch 122 thence through the lead 150, through impedance 158 and finally through common conductor 160 to the ground 162.

Figure 4:
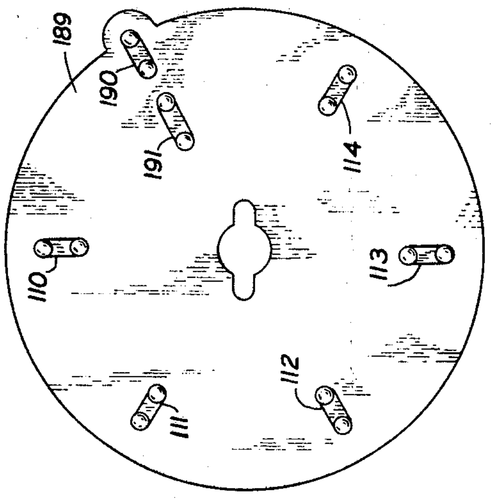
FIG. 4 represents a plan view of a rotary switch member adapted to mate with and to shift the monitor sampling of the video signals fed into the plate member of FIG. 3.
Figure 3:
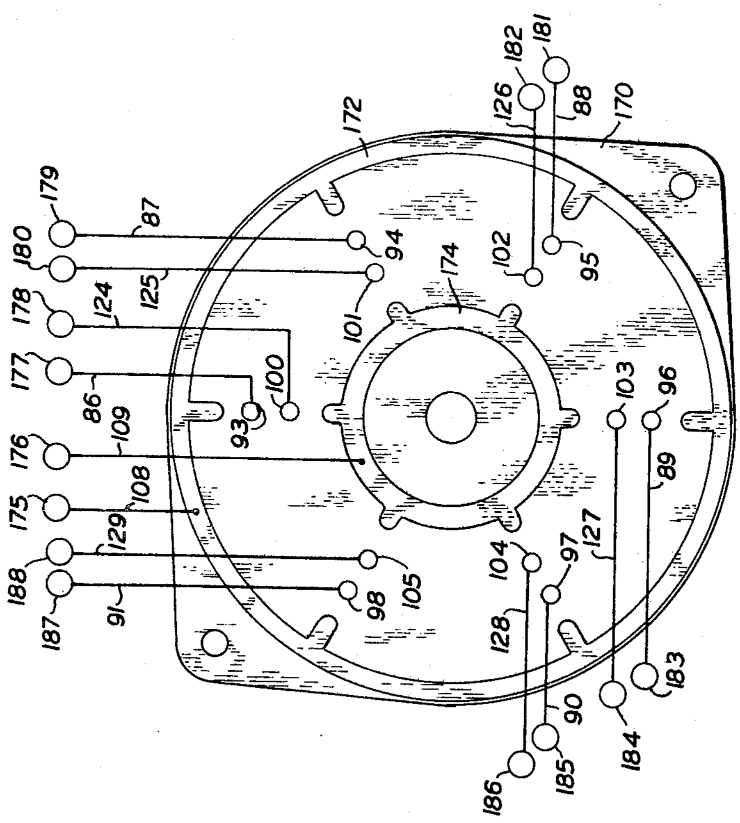
FIG. 3 represents a plan view of a fixed plate member of a rotary switch adapted to conduct through the switch the signal from five cameras while conducting the signal of a sixth camera to the monitor sampling the signals of the system of FIG. 2.

Referring next to FIGS. 3 and 4, there is shown a switch adapted to perform the function of switches 92, 120, 121 and 122 of FIG. 2. The switch shown is a six-position, wafer-type switch with a rotating member adapted to open and close circuits connected to a fixed member maintained in spaced relationship to the rotating member.

In FIG. 3 is seen the stationary or fixed member of the switch in which a plate 170, preferably of fiber filled plastic, has mounted thereon an outer contact ring 172 and inner contact ring 174. Assuming that this switch is the switch 92 serving the first monitor 107, in this switch the leads and the various contacts are the contacts shown in the phantom outline defining the switch 92. Therefore, to an outer contact ring 172 the lead 108 is connected to a coaxial connector identified 175. Lead 109 is connected to a coaxial connector 176 and to the inner contact ring 174. Both coaxial connectors 175 and 176 are connected to the monitor 107 to provide conductive extensions of leads 108 and 109.

For the purposes of this description, an upper vertically disposed contact connector corresponding to contact 93 is spaced interiorly of ring 172 and connects with lead 86. Aligned with and adjacent inwardly of contact connector 93 is a lower contact connector 100 connected to lead 124. This lead terminates in a coaxial connector as does lead 86, the connectors being identified as 177 and 178. Continuing clockwise as seen in FIG. 3 terminal contact 94 is connected to lead 87 and to coaxial connector 179 while terminal contact 101 is connected to lead 87 and to coaxial connector 179 while terminal contact 101 is connected to lead 125 and to coaxial connector 180. Continuing next clockwise, a terminal contact 95 is connected by lead 88 and to coaxial connector 181 while terminal contact 102 is connected to lead 126 and to coaxial connector 182.

Continuing to the six o'lock or bottom vertical position, terminal contact 96 is connected to lead 89 and to coaxial connector 183 while terminal contact 103 is connected to lead 127 and to coaxial connector 184. Continuing further clockwise, terminal contact 97 is connected to lead 90 and to coaxial connector 185 while terminal contact 104 is connected to lead 128 and to coaxial connector 186. Finally, continuing clockwise, terminal contact 98 is connected to lead 91 and to coaxial connector 187 while contact 105 is connected to lead 129 and to coaxial connector 188.

Referring next to FIG. 4 it is to be noted that a contact plate 189, preferably of fiber filled plastic, is adapted to rotate into six oriented positions. Mounted on this rotatable plate are five ball end conductors corresponding in function to internal conductors 110, 111, 112, 113 and 114 are rotatable with the plate and are sized and spaced to engage the various terminal contact pairs 93/100, 94/101, 95/102, 96/103, 97/104 and 98/105. The monitor connectors are exemplified by ball end conductors 190 and 191 corresponding to connector segments 108*a* and 109*a* each adapted to simultaneously engage and connect an inwardly extending portion of a contacting ring and a terminal contact. It is readily determined that if the terminal contacts seen in FIG. 3 are carried through the non-conductive plate 170 and the inwardly extending protuberances on the collector rings 172 and 174 are also carried through the plate 170 their opposite sides may be shaped to form contacts on the opposite or unseen side of the plate 170. The ball shaped protruding portions formed on the conductors 110, 111, 112, 113, 114, 190 and 191 are mounted and spaced on the rotating plate 189 so that, as shown, when the rotating plate 189 is brought into rotating contact with the back side of plate 170 the conductor 110 provides a bridge or conductor from contact 93 to contact 100. In a like manner the conductor 111 is a bridge from the contact 98 to contact 105; the conductor 112 is a bridge from the contact 97 to contact 104; the conductor 113 is a bridge from the contact 96 to contact 103, and the conductor 114 is a bridge from the contact 95 to the contact 102. The conductor 19 contacts the connector protrusion on the interior collector ring 174 and contact 101 while at the same time the conductor 190 forms a conductor between contact 94 and a protrusion on the outer collector ring 172.

The switch of FIGS. 3 and 4, when operatively connected to the monitor 107 by coaxial connectors 176 and 175 and with the rotating member 189 in the position shown, has the monitor connected to sample the camera feeding lines 87 and 125 which is the second camera 81. When the switch member 189 is turned clockwise one-sixth of a rotation, the camera signal fed the monitor 107 is the signal from the third camera identified as 82. As the member 189 is rotated further clockwise to the next set of contacts, the fourth camera 83 is sampled by the monitor and at the next position the monitor samples the fifth camera 84 and at the next position the sixth camera 85.

It is also to be noted that every time the switch member 189 is moved one-sixth of a revolution, the bridge conductors 110, 111, 112, 113 and 114 are brought in the way of radially spaced contacts and form the internal connectors as seen in FIG. 2. As the switch member 189 is rotated, the through feeding of the signal from the camera to the next switch is only momentarily interrupted and after the switch is brought into place with the internal connectors in engaged position the signal from the camera is conducted to the next switch. It is contemplated that the switches 120, 121 and 122 are of like construction and provide a circuit changing means whereby each monitor is selectively fed from a circuit carrying a video signal. Each selected signal is fed into the monitor where it is sampled and thence back into the circuit.

Figure 5:
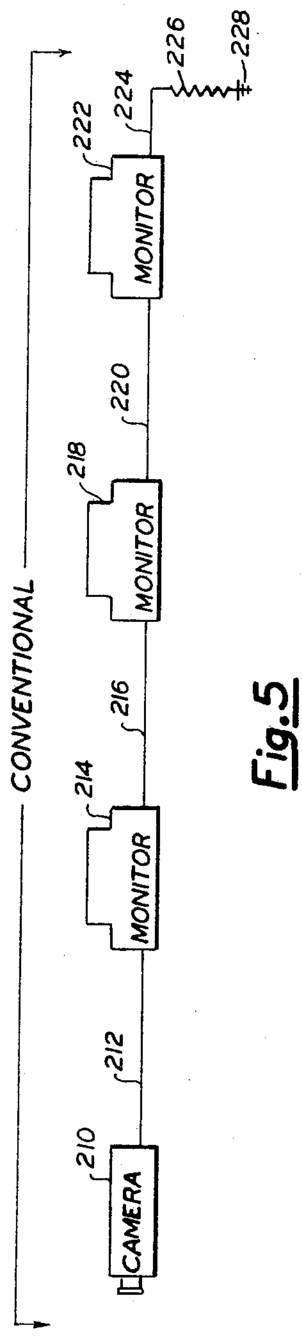
FIG. 5 represents a conventional closed circuit TV system used with one camera and two or more sample connected monitors.

Referring finally to FIG. 5 it is to be noted that in all of the above circuits the sequence video signal feeding of a conventional circuit for a single camera is maintained. In the conventional circuit a video signal from a camera 210 is fed through lead 212 to a plurality of monitors in sequence and from the final monitor to an impedance and ground. The circuit of FIG. 5 includes the camera 210 from which the signal is fed through lead 212 to the input jack of a first monitor 214 and out the output jack through lead 216 to the input jack of a second monitor 218. From the output jack of this second monitor the signal continues through lead 220 to the input jack of a third monitor 222 and out the output jack through lead 224 to an impedance 226, which in this case is preferably seventy-five ohms, and the finally to ground 228. This video circuit is conventionally used for single camera systems having a plurality of monitors. Plural camera systems with a plurality of monitors, prior to this invention, are conventionally provided with a distributing amplifier circuit means for each camera.

Figure 6:
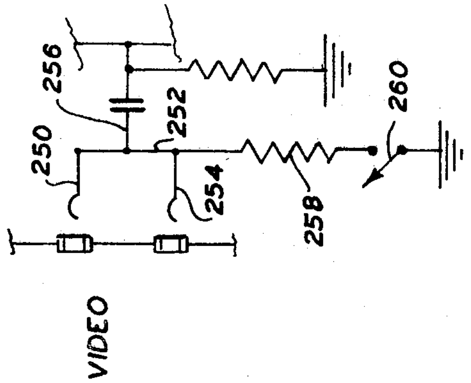
Fig.6 PRIOR ART
FIG. 6 represents a portion of the schematic circuit of a TV monitor and showing the arrangement for sampling a video signal.

In FIG. 6 there is shown a fragmentary view of schematic circuit of a TV monitor. The video signal is fed into the monitor by an input jack 250 which is connected to a conductor 252. Conductor 252 is connected to an output jack 254 and to a conductor 256 by which the video signal is received by the monitor. Conductor 252 is also connected to resistor 258 which usually is of seventy-five ohms resistance. A switch 260 connects the resistor 258 to the ground. Although this schematic circuit for a TV monitor is conventional, a full circuit having this input and output jack with an inner connected conductor is found in a TV monitor schematic dated Nov. 26, 1963 and provided by Miratel Electronics, Inc. of 3600 Richardson St., New Brighton, St. Paul, Minn., for their monitor Model No. L8M.

USE AND OPERATION

In the use and operation of the circuit of FIG. 2 the actuation of a switch causes the signal to following monitors to be momentarily affected as the switch is moved from one position to another. As soon as contact in the switch is re-established the effected monitors are brought back into full operation with only a momentary loss of picture. As seen in FIG. 2 it is readily determined that any number of monitors may be connected into the sequence and that a plurality of cameras may be arranged as desired. Each of a desired number of monitors may be selectively connected to any camera to view the picture being sent therefrom.

Although six cameras and four monitors are shown as representative of a grouping thereof, it is only necessary that the desired number of cameras be connected with circuits having switches with a connective position to accommodate each camera. For example, if twelve cameras are to be provided, there is a twelve-position switch which, if it is a switch constructed in accordance to the principle of the switch of FIGS. 3 and 4, the switch has collector rings adapted to have twelve contacting positions. Twelve sets of internal contacts are arranged on the movable plate and are sized in precise spacing so that the movable contact plate is movable to twelve different positions. An indicating knob mounted on the shaft to rotate the movable plate customarily has an indicating portion adapted to cooperate with a fixedly mounted indicia inscribed means such as numbered rings and the like. It is, of course, readily realized that a twelve-position switch might serve a lesser number cameras and the monitor connected thereto and with the unused portions of the switch positions unconnected and being unused until desired. The number of cameras and monitors is merely a manner of selection.

The terms "in," "out," "up," "down," "vertical," "clockwise" and the like are applicable to the embodiments as shown and described in conjunction with the drawings. These terms are merely for the purpose of description and do not necessarily apply to the position in which the closed-circuit TV switching system may be constructed or used.

The invention in its broader aspects is not limited to the specific embodiments shown and described but departures therefrom may be made within the scope of the accompanying claims and without sacrificing it chief advantages and protection is sought to the broadest extent the prior art allows.

What is claimed is:

1. In a closed circuit TV switching and sampling circuit in which at least two cameras are each connected to a video conducting line each terminating in a determined impedance and ground, each conducting line connected to and leading through a plurality of monitoring switches with each switch serving one monitor, the circuit and switches adapted to permit each monitor operator to selectively sample the video signal from each camera feeding a signal to the monitoring switches, said switching circuit comprising: (a) a plurality of cameras each providing a video signal to a conductive line terminating in a determined impedance and ground; (b) a monitoring switch conductively connected to one of a plurality of monitors, each switch having an imput conductive lead from an input jack of the monitor to a first sampling conductor adapted to move to and engage each of a plurality of imput contacts, each conductively connected to a video signal carrying line; (c) a second sampling conductor attached to a conductive lead extending from an output jack of the monitor to said second sampling conductor, this conductor adapted to move to and engage each of a plurality of output contacts each conductively connected to a video signal carrying line; and (d) a quantity of through conductors equal in quantity to at least the number of video signal carrying lines less one, each through conductor adapted to be moved to and engage an imput and an output contact to carry the video signal from contact to contact, whence the switch is manipulated to be selectively moved to a determined set of contacts, the sampling conductors engage an imput and output contact to lead a video signal from the sampled line to and from the monitor and the simultaneously moved through conductors engage other imput and output contacts to conduct the line carrying video signals to the continuing line.

2. A closed circuit TV switching and sampling circuit as in claim 1 in which the monitoring switch is a rotary switch having positive indicating means for the determining of which of the video signal carrying lines is being selectively sampled.

3. A closed crcuit TV switching and sampling circuit as in claim 1 in which the impedances terminating each video signal carrying line is about seventy-five ohms.

4. A closed circuit TV switching and sampling circuit as in claim 1 in which the number of cameras in the circuit are at least six, and the capacity of each of the monitor switches is at least six video signal carrying lines.

5. A closed circuit TV switching and sampling circuit as in claim 2 in which the monitoring switch has a plurality of input lead connections of a number not less than the number of video signal lines, each imput lead connection terminating in a contact; a plurality of output lead connections of the same number as the number of imput lead connections, each output lead connection terminating in a contact, a sampling circuit in the switch and including an imput and an output lead connection for and to the monitor and return; a plurality of through conductors of a number equal to the video signal imput connections less one, each through conductor selectively movable to engage a contact of both an imput and an output video signal line; and a pair of movable sampling conductors moved as and when the through conductors are moved, the sampling conductors disposed so that one is adapted to engage a video input contact and to conduct the video signal from that contact to a monitor input jack, and the other movable conductor adapted to engage a video output contact and to receive from the monitor output jack the video signal after being sampled by the monitor and deliver the signal to the output contact and thence to the connected output connector, whereby the through conductors and sampling conductors are moved so that the sampling conductors selectively sample the video signal conducted by that particular signal conducting line while the through conductors feed the other video signals from the imput contact through the switch and to the output contact of the switch and to the output connector.

6. In a closed circuit TV switching system in which a plurality of video cameras are each connected to conduct a video signal to a signal conducting line terminating in an impedance and ground, and a plurality of video monitors each connected to the lines and by a switch are adapted to selectively sample the video signal in any signal conducting line feeding through their switch, and with a switch for each monitor, said switch as connected comprising: a plurality of imput lead connections of a number not less than the number of video signal lines, each imput lead connection terminating in a contact; a plurality of output lead connections of the same number as the number of imput lead connections, each output lead connection terminating in a contact, a sampling circuit in the switch and including an imput and an output lead connection for and to the monitor and return; a plurality of through conductors of a number equal to the video signal imput connections less one, each through conductor selectively movable to engage a contact of both an imput and an output video signal line; and a pair of movable sampling conductors moved as and when the through conductors are moved, the sampling conductors disposed so that one is adapted to engage a video imput contact and to conduct the video signal from that contact to a monitor imput connector, and the other movable conductor adapted to engage a video output contact and to receive from the monitor output connector the video signal after being sampled by the monitor and deliver the signal to the output contact and thence to the connected output connector, whereby the through conductors and sampling conductors are moved so that the sampling conductors selectively sample the video signal conducted by that particular signal conducting line while the through conductors feed the other video signals from the imput contact through the switch and to the output contact of the switch and to the output connector.

7. In a closed circuit TV switching system as in claim 6 in which the switch has a fixed plate and a rotatably movable plate in substantially parallel relationship thereto, the movable plate being urged into contacting engagement with contacting portions on the face of the fixed plate.

8. In a closed circuit TV switching system as in claim 6 in which there is a fixed plate member and a rotatably movable plate member, the fixed plate member having an outer contact ring and an inner contact ring mounted thereon each ring having contacting portions radially aligned with each other; and in which, in cooperative relationship to each contacting portion of the rings there are attached to the fixed plate a mated pair of signal conducting contacts; and in which the contacting rings are connected to the sampling circuit with the monitor input lead connected to one ring and the monitor output lead connected to the other ring; each pair of signal conducting contacts connected to the signal conducting line with one contact connected to an input lead and the other contact connected to an output lead; and mounted on the movable plate, a plurality of through conductors each adapted to engage a mating pair of the signal conducting contacts, and a pair of sampling conductors each adapted to engage signal conducting contact and a contacting portion of a contact ring.

9. In a closed circuit TV switching system as in claim 8 in which the signal conducting contacts on the fixed plate are mounted intermediate the inner and the outer contact rings said signal conducting contacts being aligned with the radially disposed contact portions of the inner and outer contact rings.

References Cited

UNITED STATES PATENTS

| | | | |
|---|---|---|---|
| 3,048,669 | 8/1962 | Mikkola et al. | 200—11 |
| 3,244,809 | 4/1966 | Fuller et al. | |

ROBERT L. GRIFFIN, Primary Examiner

B. L. LEIBOWITZ, Assistant Examiner